United States Patent
Hwang et al.

(10) Patent No.: US 9,680,578 B2
(45) Date of Patent: Jun. 13, 2017

(54) SOFT PACKET COMBINING FOR SUPERPOSITION CODING

(71) Applicant: MEDIATEK INC., Hsinchu (TW)

(72) Inventors: Chien-Hwa Hwang, Hsinchu County (TW); Yi-Ju Liao, Hsinchu (TW); Tze-Ping Low, Lexington, MA (US); Lung-Sheng Tsai, Tainan (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/980,991

(22) Filed: Dec. 28, 2015

(65) Prior Publication Data

US 2016/0191174 A1 Jun. 30, 2016

Related U.S. Application Data

(60) Provisional application No. 62/097,803, filed on Dec. 30, 2014.

(51) Int. Cl.
| | |
|---|---|
| *H04B 15/00* | (2006.01) |
| *H04L 1/18* | (2006.01) |
| *H04L 12/861* | (2013.01) |
| *H04L 5/00* | (2006.01) |

(52) U.S. Cl.
CPC .......... *H04B 15/00* (2013.01); *H04L 1/1812* (2013.01); *H04L 1/1835* (2013.01); *H04L 5/0055* (2013.01); *H04L 1/1845* (2013.01); *H04L 5/0023* (2013.01); *H04L 49/9057* (2013.01)

(58) Field of Classification Search
CPC ..... H04B 15/00; H04L 1/1812; H04L 1/1809; H04L 1/1822; H04L 5/0005; H04L 49/9057; H04L 1/18; H04L 1/1835; H04L 1/1845; H04L 5/0055
See application file for complete search history.

(56) References Cited

U.S. PATENT DOCUMENTS

| | | | |
|---|---|---|---|
| 8,286,047 B2 | 10/2012 | Che et al. | 714/751 |
| 8,665,720 B2 | 3/2014 | Shen et al. | 370/235 |
| 8,724,742 B2 | 5/2014 | Nimbalker et al. | 375/316 |
| 2008/0005638 A1 | 1/2008 | Kuo et al. | 714/748 |
| 2012/0057529 A1 | 3/2012 | Seo et al. | 370/328 |
| 2012/0269137 A1 | 10/2012 | Kang et al. | 370/329 |
| 2012/0275397 A1 | 11/2012 | Hsieh et al. | 370/329 |

(Continued)

FOREIGN PATENT DOCUMENTS

| | | |
|---|---|---|
| CN | 101094048 A | 6/2006 |
| CN | 101965707 A | 3/2008 |

(Continued)

OTHER PUBLICATIONS

Choi "H-ARQ based on Non-Orthogonal Multiple Access with Successive Interference Cancellation", 2008, IEEE, pp. 1-5.*

(Continued)

*Primary Examiner* — Sophia Vlahos
(74) *Attorney, Agent, or Firm* — Imperium Patent Works; Zheng Jin

(57) ABSTRACT

A method is proposed to enable a UE performing codeword level interference cancellation (CW-IC) to know whether an interfering transport block (TB) is a new transmission or retransmission. With this knowledge, the UE knows whether the soft channel bits stored in a soft buffer are to be discarded or combined with the soft channel bits newly obtained.

20 Claims, 6 Drawing Sheets

(56) References Cited

U.S. PATENT DOCUMENTS

| | | |
|---|---|---|
| 2013/0051289 A1 | 2/2013 | Hsieh et al. .................. 370/280 |
| 2013/0121216 A1 | 5/2013 | Chen et al. ................... 370/280 |
| 2013/0165183 A1 | 6/2013 | Gerstenberger et al. ..... 455/561 |
| 2013/0252624 A1 | 9/2013 | Pajukoski et al. ......... 455/452.1 |
| 2014/0044091 A1 | 2/2014 | Kishiyama .................... 370/330 |
| 2014/0044206 A1* | 2/2014 | Nammi ................ H04B 7/0417 375/267 |
| 2014/0086372 A1 | 3/2014 | Kishiyama et al. .......... 375/346 |
| 2014/0245095 A1 | 8/2014 | Nammi et al. ................ 714/749 |
| 2014/0321418 A1 | 10/2014 | Rinne et al. .................. 370/329 |
| 2015/0171983 A1 | 6/2015 | Kusashima ................... 370/329 |
| 2015/0312074 A1* | 10/2015 | Zhu .................... H04L 27/2627 370/329 |
| 2016/0174230 A1* | 6/2016 | Benjebbour ........ H04W 52/346 370/329 |

FOREIGN PATENT DOCUMENTS

| | | |
|---|---|---|
| CN | 103155470 A | 10/2010 |
| CN | 102761510 A | 4/2011 |
| CN | 103609052 A | 4/2011 |
| CN | 103493380 A | 5/2011 |
| CN | 103051435 A | 8/2011 |
| CN | 104040930 A | 12/2011 |
| WO | WO2013070837 A1 | 11/2011 |
| WO | WO2012161081 A1 | 11/2013 |
| WO | WO2013176042 A1 | 11/2013 |

OTHER PUBLICATIONS

English translation of JP2015-012458A.*
English translation of PCT/JP2014/056035.*
International Search Report and Written Opinion of International Search Authority for PCT/CN2015/099663 dated Mar. 23, 2016 (11 pages).
International Search Report and Written Opinion of International Search Authority for PCT/CN2015/099664 dated Mar. 24, 2016 (12 pages).
International Search Report and Written Opinion of International Search Authority for PCT/CN2015/099665 dated Mar. 24, 2016 (11 pages).
International Search Report and Written Opinion of International Search Authority for PCT/CN2015/099666 dated Mar. 22, 2016 (11 pages).
3GPP TS 36.212 V13.1.0 (Mar. 2016), 3rd Generation Partnership Project; Technical specification Group Radio access Network; Evolved Universal Terrestrial Radio Access (E-UTRA); Multiplexing and channel coding (Release 13) Section 5.3.3.1.

* cited by examiner (NDI1, NDI2) = ('1', '1') in the DCI of subframe 11

(NDI1, NDI2) = ('1', '0') in the DCI of subframe 11

(NDI1, NDI2) = ('0', '1') in the DCI of subframe 11

(NDI1, NDI2) = ('0', '0') in the DCI of subframe 11

SOFT PACKET COMBINING FOR SUPERPOSITION CODING

CROSS REFERENCE TO RELATED APPLICATIONS

This application claims priority under 35 U.S.C. §119 from U.S. Provisional Application No. 62/097,803, entitled "Soft Packet Combining for Superposition Coding," filed on Dec. 30, 2014, the subject matter of which is incorporated herein by reference.

TECHNICAL FIELD

The disclosed embodiments relate generally to mobile communication networks, and, more particularly, to soft buffer combining for superposition coding.

BACKGROUND

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of multiuser operation from both transmitter and receiver's perspective has the potential to further improve multiuser system capacity even if the transmission/precoding is non-orthogonal which could come from, for example but not limited to, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth. An example of such joint Tx/Rx optimization associated with adaptive Tx power allocation and codeword level interference cancellation (CW-IC) receiver is recently a remarkable technical trend, including non-orthogonal multiple access (NOMA) and other schemes based on superposition coding.

When CW-IC is used, it is helpful if the soft buffer of the receiver is reserved for not only the desired transport block (TB) but also the interfering TBs to be handled by CW-IC. In so doing, the soft channel bits of interfering TBs at multiple (re)transmissions can be combined to enhance the success rate of data decoding. However, since the UE performing CW-IC has no idea about whether the interfering TB is a new transmission or a retransmission, the UE does not know whether soft packet combining is to be performed for the interfering TB. A solution is sought.

SUMMARY

A method is proposed to enable a UE performing codeword level interference cancellation (CW-IC) to know whether an interfering transport block (TB) is a new transmission or retransmission. With this knowledge, the UE knows whether the soft channel bits stored in a soft buffer are to be discarded or combined with the soft channel bits newly obtained.

In one embodiment, a base station encodes a first transport block TB1 to be transmitted to a first UE over a time-frequency resource. The base station encodes a second transport block TB2 to be transmitted to a second UE. TB1 and TB2 are superposed. The base station determines a first NDI1 and a second NDI2 indicating whether TB1 and TB2 are new transport blocks or retransmission transport blocks. The base station transmits encoded information bits of the transport blocks to the UEs. The base station also transmits the first and the second NDIs to the first UE for interference cancellation.

In another embodiment, a first UE stores soft channel bits of a first plurality of encoded information bits associated with a first transport block TB1 from a base station intended for the first UE. TB1 is associated with a first HARQ process number of the first UE. The first UE stores soft channel bits of a second plurality of encoded information bits associated with a second transport block TB2 from the BS intended to a second UE. TB2 is associated with a second HARQ process number of the second UE. The first UE receives a first NDI1 and a second NDI2 indicating whether TB1 and TB2 are new transport blocks or retransmission transport blocks. The first UE determines whether to perform soft packet combining for TB1 and TB2 based on NDI1 and NDI2.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
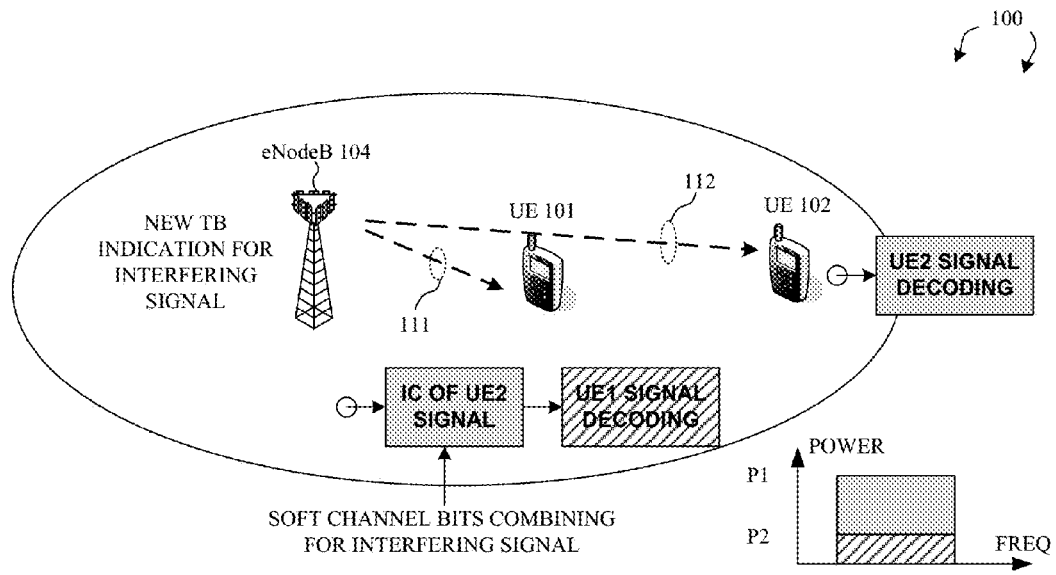
FIG. 1 illustrates a mobile communication network with soft packet combining for superposition coding and interference cancellation in accordance with one novel aspect.

FIG. 1 illustrates a mobile communication network 100 with superposition coding in accordance with one novel aspect. Mobile communication network 100 is an OFDM network comprising a plurality of user equipments UE 101, UE 102, and a serving base station eNB 104. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource elements are grouped into resource blocks, where each resource block (RB) consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, UE 101 (UE#1) is served by its serving base station eNB 104. UE#1 receives desired radio signal 111 transmitted from eNB 104. However, UE#1 also receives interfering radio signals. In one example, UE#1 receives interfering radio signal 112 transmitted from the same serving eNB 104 due to non-orthogonal multiple access (NOMA) operation intended for multiple UEs (e.g., UE 102/UE#2) in the same serving cell. UE#1 may be equipped with an interference cancellation (IC) receiver that is capable of cancelling the contribution of the interfering signals from the desired signals.

Assume superposition coding scheme is used at the transmitter for the NOMA operation. Given the scenario of NOMA where UE#1 and UE#2 are scheduled in the same time-frequency resource and the transport blocks (TBs) intended to UEs #1 and #2 are superposed and multi-casted to the two users with different transmission power levels (P1>P2). Suppose that UE#1 is closer to the base station (eNB 104) than UE#2 and the former and latter UEs are referred to as high- and low-geometry UEs, respectively. According to the rule of signal reception of NOMA, the receiver of UE#1 should perform codeword level interference cancellation (CW-IC) for the TB intended to UE#2. Specifically, UE#1 decodes the TB intended to UE#2, reconstructs the contribution of the UE#2's signal in the received signal, and then subtracts the reconstructed signal from the received signal to form a clean received signal. UE#1 can therefore decode its own signal via the clean received signal. When UE#1 has a decoding failure for UE#2's TB, it is helpful for the next decoding of the TB if UE#1 stores the soft channel bits of that TB. Therefore, when NOMA is used, it is beneficial for the high-geometry UE to be equipped with a soft buffer not only for its own signal but also for those interfering signals to be processed with the CW-IC. In so doing, multiple (re)transmissions of the interfering TB can be combined to enhance the success rate of decoding.

In a superposition coding scheme, whether a TB is to be transmitted or not is merely determined by the reception status (success or failure) of the signal's target UE, not related to the reception status of the UE performing CW-IC. The UE performing CW-IC does not report the reception status (HARQ acknowledgment) of the interfering TBs to the system. For example, if UE#2 fails to decoding its own TB, a negative acknowledgment is replied and the signal will be re-transmitted no matter UE#1 succeeds in decoding the TB or not. On the contrary, if UE#2 succeeds in decoding its own TB, the signal will not be transmitted again regardless of UE#1's reception status on the TB. Therefore, since UE#1 has no idea about the UE#2's reception status of its own signal at previous transmit instance, UE#1 does not know whether the TB intended to UE#2 in the current subframe is a new transmission or retransmission. In accordance with one novel aspect, a method to enable the UE performing CW-IC to know whether an interfering TB is new or not is proposed. With this knowledge, the UE knows whether the soft channel bits stored in a soft buffer are to be discarded or combined with newly obtained soft channel bits.

Figure 2:
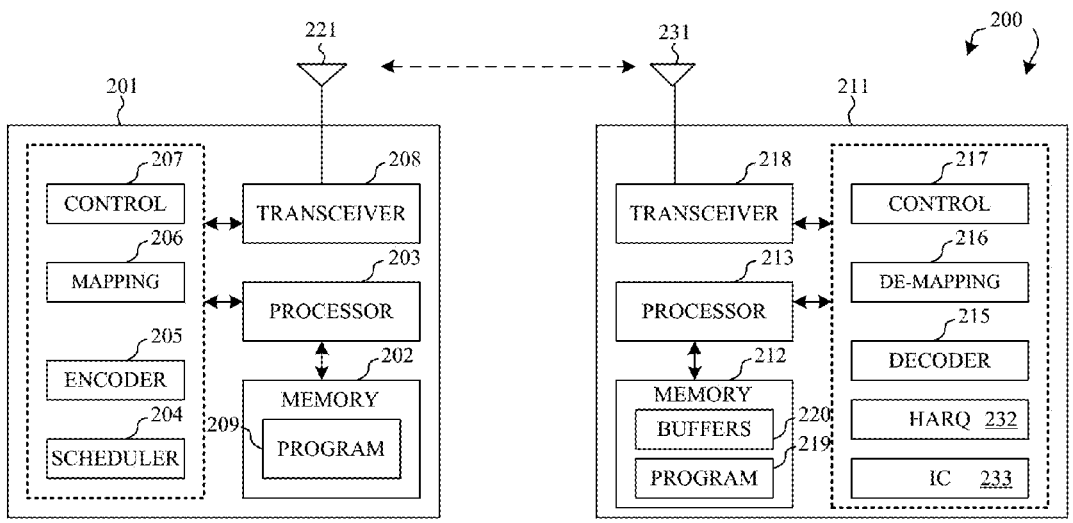
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE. Memory 212 also contains a plurality of soft buffers 220 for storing soft channel bits of encoded code blocks.

Base station 201 and UE 211 also include several functional modules to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via encoder 205), mapping (via mapping circuit 206), and transmit control information and data (via control circuit 207) to UE 211, and allow UE 211 to receive, de-mapping (via de-mapper 216), and decode (via decoder 215) the control information and data (via control circuit 217) accordingly with interference cancellation capability.

In one example, base station 201 provides new TB indication for both desired and interfering TBS to UE 211. Under NOMA operation, upon receiving superposed code blocks intended for other UEs, UE 211 is then able to perform Hybrid Automatic Repeat Request (HARQ) via HARQ handler 232, store soft channel bits into partitioned soft buffers for both desired and interfering TBs, decide whether to discard or combine the soft channel bits of the desired and the interfering TBs based on the new data indication, and then perform codeword level interference cancellation (CW-IC) via IC circuit 233 to decode the superposed code blocks and cancel the contribution of the interfering signals accordingly.

Figure 3:
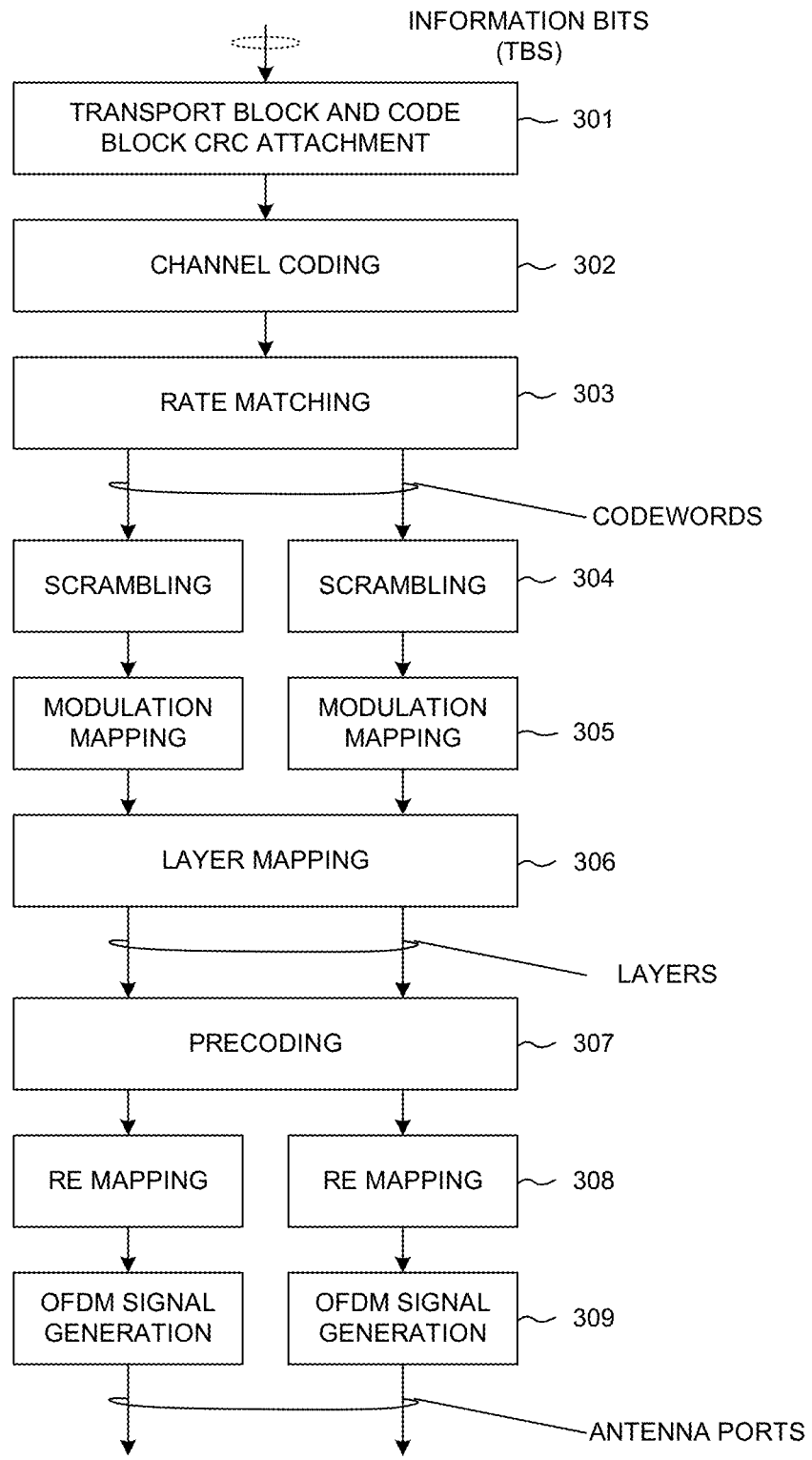
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate. In step 303, rate matching is performed, which creates an output with a desired code rate, and where the TBs are mapped into codewords. In step 304, the codewords are scrambled based on predefined scrambling rule (e.g., scramble with a corresponding Radio Network Temporary Identifier (RNTI) of the UE). In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). Finally, in step 309, OFDM signals are generated for baseband signal transmission via antenna ports.

At the UE receiver side, the log likelihood ratio (LLRs) for the received information bits associated with a TB (re)-transmission, referred as soft channel bits, are computed. The UE reserves a soft buffer to store the soft channel bits for HARQ soft packet combining and decoding of the received information bits. If the soft buffer for the code block is empty, the soft channel bits are stored in the soft buffer; otherwise, the soft channel bits stored at the soft buffer are updated based on the newly computed. Finally, turbo decoding is performed to recover the information bits. However, the UE needs to know whether the TB is an initial transmission or a retransmission depending on the reception status feedback, i.e., HARQ acknowledgment. Only with this knowledge, the UE knows whether the soft channel bits stored in the soft buffer are to be discarded or combined with newly obtained soft channel bits.

Referring back to FIG. 1, according to the current LTE specifications, UE#1 receives a New Data Indicator (NDI) flag for its own TB in the downlink scheduling assignment of the physical downlink shared channel (PDSCH). In accordance with one novel aspect, in addition to the NDI flag for its own TB, eNB 104 sends to UE#1 another NDI flag for the TB intended to UE#2. To differentiate the two NDI flags, we use $NDI_1$ and $NDI_2$ to indicate the NDI flags for the TBs intended to UE#1 and UE#2, respectively. Both NDIs are carried in the downlink scheduling assignment for UE#1. The behaviors of UE#1 on soft packet combining and soft buffer management for various combinations of ($NDI_1$, $NDI_2$) are discussed below, where '1' or '0' represents the NDI is toggled or not, respectively. For simplicity, in the following discussion, TB1 refers to a desired TB, i.e., the transport block intended to UE#1, and TB2 refers to an interfering TB.

Figure 4:
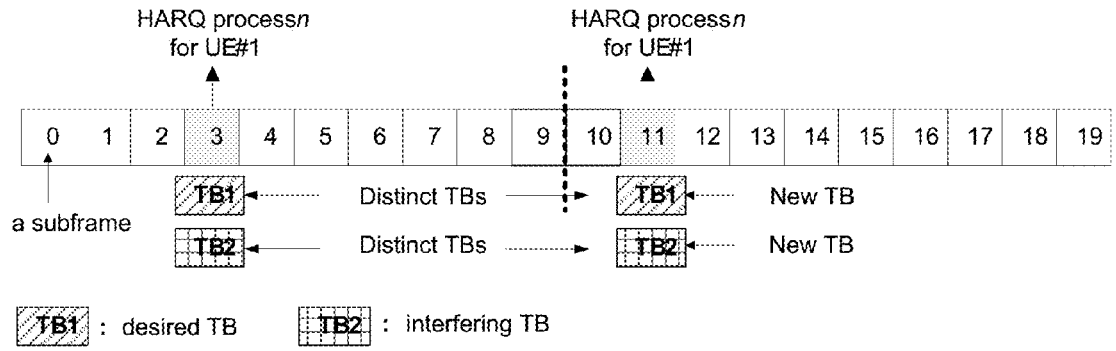
FIG. 4 illustrates a first embodiment of HARQ soft packet combining for desired and interfering TB based on new TB indication.

FIG. 4 illustrates a first embodiment of downlink HARQ processes and soft packet combining associated with desired and interfering signals. In the example of FIGS. 4, TB1 and TB2 are superposed in the same time-frequency resource, and TB1 and TB2 are desired TBs (intended for a high-geometry UE#1) and interference TBs (intended for other UEs), respectively, from UE#1's perspective. The transmission of TB1 and TB2 both take place at subframe 3. A subsequent transmission of TB1 and TB2 both take place at subframe 11. It is assumed TB1 is associated with the n-th DL HARQ process of UE#1 and TB2 is associated with the m-th DL HARQ process of UE#2. In this embodiment, ($NDI_1$, $NDI_2$)=('1', '1') in the DCI of subframe 11. The meaning of $NDI_1$='1' is TB1 in subframe 11 is a new TB relative to the TB received in the previous subframe of the n-th HARQ process (i.e., subframe 3), and $NDI_2$='1' means TB2 in subframe 11 is a new TB relative to the TB received in the previous subframe of the m-th DL HARQ process (i.e., subframe 3). For both TB1 and TB2, the status of "new TB" or "retransmitted TB" is based on two adjacent subframes belonging to the DL HARQ processes of UE#1 and UE#2. Since both TB1 and TB2 are new transmissions, no soft packet combining is performed at UE#1, and UE#1 can clear the soft buffers for TB1 and TB2 of the HARQ processes. UE#1 decodes TB2 at subframe 11. If the decoding is successful, UE#1 performs the CW-IC for TB2 and detects/decodes TB1 using the cleaner received signal. If the decoding of TB2 fails, UE#1 can save the soft channel bits of TB2, and UE#1 can perform symbol-level IC and detects/decodes TB1 using the cleaner received signal.

Figure 5:
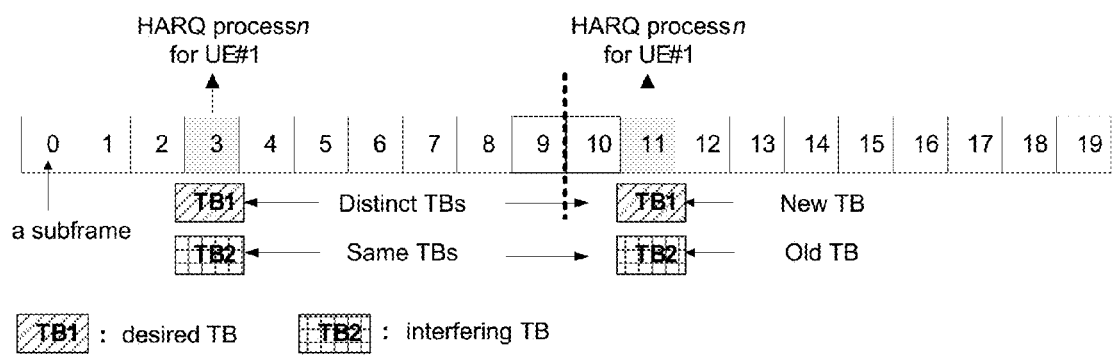
FIG. 5 illustrates a second embodiment of HARQ soft packet combining for desired and interfering TB based on new data indication.

FIG. 5 illustrates a second embodiment of downlink HARQ processes and soft packet combining associated with desired and interfering signals. In the example of FIGS. 5, TB1 and TB2 are superposed in the same time-frequency resource, and TB1 and TB2 are desired TBs (intended for a high-geometry UE#1) and interference TBs (intended for other UEs), respectively, from UE#1's perspective. The transmission of TB1 and TB2 both take place at subframe 3. A subsequent transmission of TB1 and TB2 both take place at subframe 11. It is assumed TB1 is associated with the n-th DL HARQ process of UE#1 and TB2 is associated with the m-th DL HARQ process of UE#2. In this embodiment, ($NDI_1$, $NDI_2$)=('1', '0') in the DCI of subframe 11, which means TB1 at subframe 11 is a new transmission relative to that at subframe 3, and TB2 is a retransmission. UE#1 can clear the soft buffer for TB1 of the HARQ process. UE#1 performs soft packet combining for TB2 (e.g., using TB2's soft channel bits received at subframes 3 and 11). If the decoding of TB2 is successful, UE#1 performs CW-IC and detects/decodes TB1 using the cleaner received signal. If the decoding of TB2 fails, UE#1 can update the soft channel bits of TB2 based on the soft packet combining, and it can perform symbol-level IC and detects/decodes its own signal using the cleaner received signal.

Figure 6:
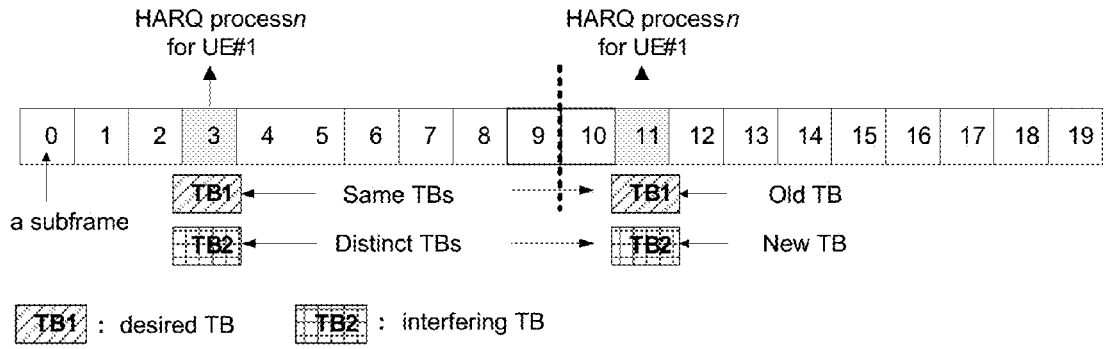
FIG. 6 illustrates a third embodiment of HARQ soft packet combining for desired and interfering TB based on new data indication.

FIG. 6 illustrates a third embodiment of downlink HARQ processes and soft packet combining associated with desired and interfering signals. In the example of FIGS. 6, TB1 and TB2 are superposed in the same time-frequency resource, and TB1 and TB2 are desired TBs (intended for a high-geometry UE#1) and interference TBs (intended for other UEs), respectively, from UE#1's perspective. The transmission of TB1 and TB2 both take place at subframe 3. A subsequent transmission of TB1 and TB2 both take place at subframe 11. It is assumed TB1 is associated with the n-th DL HARQ process of UE#1 and TB2 is associated with the m-th DL HARQ process of UE#2. In this embodiment, $(NDI_1, NDI_2)=('0', '1')$ in the DCI of subframe 11, which means TB1 at subframe 11 is a retransmission of the TB received at subframe 3, while TB2 is a new transmission. UE#1 can clear the soft buffer for TB2 of the HARQ process. UE#1 decodes TB2 at subframe 11. If the decoding of TB2 is successful, UE#1 performs CW-IC, and it detects/decodes its own signal using the cleaner received signal. Since TB1 is a retransmitted TB, soft packet combining can be used for the decoding of TB1. If the decoding of TB2 fails, UE#1 can save the soft channel bits of TB2, and it can perform symbol-level IC and detects/decodes its own signal using the cleaner received signal.

Figure 7:
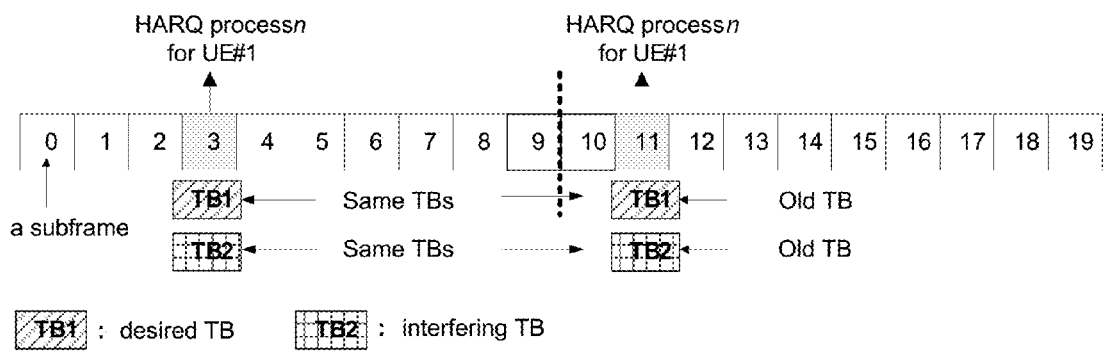
FIG. 7 illustrates a fourth embodiment of HARQ soft packet combining for desired and interfering TB based on new data indication.

FIG. 7 illustrates a fourth embodiment of downlink HARQ processes and soft packet combining associated with desired and interfering signals. In the example of FIGS. 7, TB1 and TB2 are superposed in the same time-frequency resource, and TB1 and TB2 are desired TBs (intended for a high-geometry UE#1) and interference TBs (intended for other UEs), respectively, from UE#1's perspective. The transmission of TB1 and TB2 both take place at subframe 3. A subsequent transmission of TB1 and TB2 both take place at subframe 11. It is assumed TB1 is associated with the n-th DL HARQ process of UE#1 and TB2 is associated with the m-th DL HARQ process of UE#2. In this embodiment, $(NDI_1, NDI_2)=('0', '0')$ in the DCI of subframe 11, which means both TB1 and TB2 are retransmissions. UE#1 decodes TB2 at subframe 11 with HARQ soft packet combining. If the decoding of TB2 is successful, UE#1 performs CW-IC, and it detects/decodes its own signal using the cleaner received signal. Since TB1 is a retransmitted transport block, soft packet combining can be used for the decoding of TB1. On the contrary, if the decoding of TB2 fails, UE#1 saves the soft channel bits of TB2, and it can perform symbol-level IC and detects/decodes its own signal using the cleaner received signal.

Figure 8:
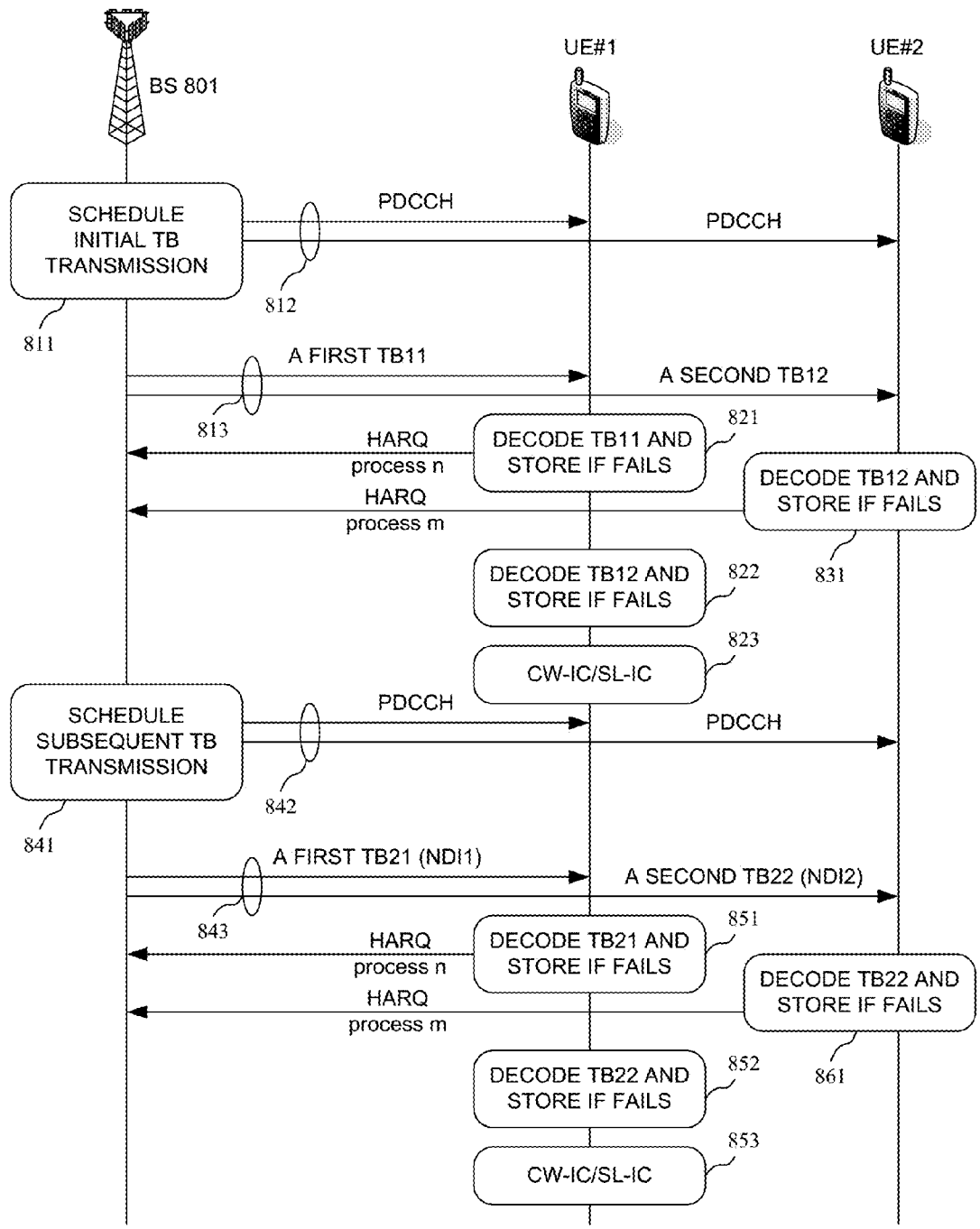
FIG. 8 illustrates a procedure of superposition coding with soft channel bits combining for both desired and interfering signals.

FIG. 8 illustrates a procedure of superposition coding with soft channel bits combining for both desired and interfering signals. In step 811, a serving base station BS 801 schedules initial TB transmission for a first UE#1 and a second UE#2 for NOMA operation. UE#1 is a high-geometry UE and UE#2 is a low-geometry UE. In step 812, the BS sends control information to UE#1 and UE#2 via PDCCH. The control information may include information of the code block soft buffer size for UE#2, and may include the maximum number of total active DL HARQ processes for UE#1. In step 813, the BS transmits superposed transport blocks TB11 and TB12 to UE#1 and UE#2 via PDSCH.

In step 821, UE#1 tries to decode TB11 and stores soft channel bits of the received encoded information bits associated with desired signal TB11 in a first soft buffer if the decoding of TB11 fails. TB11 and the first soft buffer are associated with an HAQR process number n on UE#1. If the decoding is successful, UE#1 replies to the BS with a positive acknowledgement; otherwise, UE#1 replies to the BS with a negative acknowledgement. Similarly, in step 831, UE#2 tries to decode TB12 and stores soft channel bits of the received encoded information bits associated with desired signal TB12 if the decoding of TB12 fails. TB12 is associated with an HAQR process number m on UE#2. If the decoding is successful, UE#2 replies to the BS with a positive acknowledgement; otherwise, UE#2 replies to the BS with a negative acknowledgement.

In step 822, UE#1 tries to decode TB12 and stores soft channel bits of the received encoded information bits associated with interfering signal TB12 in a second soft buffer if the decoding of TB12 fails. However, UE#1 does not reply ACK/NACK for TB12. As a result, regardless of the reception status of TB12 by UE#1, TB12 may or may not be retransmitted, depending on the reception status of TB12 by UE#2. In step 823, if the decoding of TB12 is successful, UE#1 reconstructs the contribution of the interfering signal TB12 in the received signal and performs CW-IC by subtracting the reconstructed interfering signal TB12 from the received signal. If the decoding of TB2 fails, UE#1 can save the soft channel bits of TB12, and UE#1 can perform symbol level interference cancellation (SL-IC) and then decode TB11 using the cleaner received signal.

In step 841, the BS schedules subsequent TB transmission for UE#1 and UE#2. In step 842, the BS sends control information to UE#1 and UE#2 via PDCCH. In step 843, the BS transmits superposed transport blocks TB21 to UE#1 and TB22 to UE#2 via PDSCH. TB21 and TB22 are transmitted in the same subframe belonging to the same HARQ processes as the previous TB11 and TB12 transmitted in step 813. In addition, the BS provides a new data indicator (NDI) via PDCCH, e.g., NDI1 for TB21 indicating whether TB21 is a new TB or a re-transmission relative to TB11 in the previous subframe of the n-th HARQ process of UE#1, and NDI2 for TB22 indicating whether TB22 is a new TB or a re-transmission relative to TB12 in the previous subframe of the m-th HARQ process of UE#2.

In step 851, if TB21 is a new transmission, then UE#1 clears the first soft buffer associated with the n-th HARQ process of UE#1. If the decoding is successful, UE#1 replies to the BS with a positive acknowledgement; otherwise, UE#1 replies to the BS with a negative acknowledgement. On the other hand, if TB21 is a re-transmission of TB11, then UE#1 decodes TB21 using soft packet combining via the first soft buffer associated with the n-th HARQ process. Similarly, in step 861, if TB22 is a new transmission, then UE#2 clears its soft buffer associated with the m-th HARQ process of UE#2. If the decoding is successful, UE#2 replies to the BS with a positive acknowledgement; otherwise, UE#2 replies to the BS with a negative acknowledgement. On the other hand, if TB22 is a re-transmission of TB12, then UE#2 decodes TB22 using soft packet combining via its soft buffer associated with the m-th HARQ process.

In step 852, if TB22 is a new transmission, then UE#1 clears the second soft buffer associated with the m-th HARQ process of UE#2. However, UE#1 does not reply ACK/NACK for TB22. As a result, regardless of the reception status of TB22 by UE#1, TB22 may or may not be retransmitted, depending on the reception status of TB22 by UE#2. On the other hand, if TB22 is a re-transmission of TB12, then UE#1 decodes TB22 using soft packet combining via the second soft buffer associated with the m-th HARQ process. In step 853, if the decoding of TB22 is successful, UE#1 reconstructs the contribution of the interfering signal TB22 in the received signal and performs CW-IC by subtracting the reconstructed interfering signal TB22 from the received signal. If the decoding of TB22 fails, UE#1 can save the soft channel bits of TB22, and UE#1 can perform SL-IC and then decode TB21 using the cleaner received signal.

Figure 9:
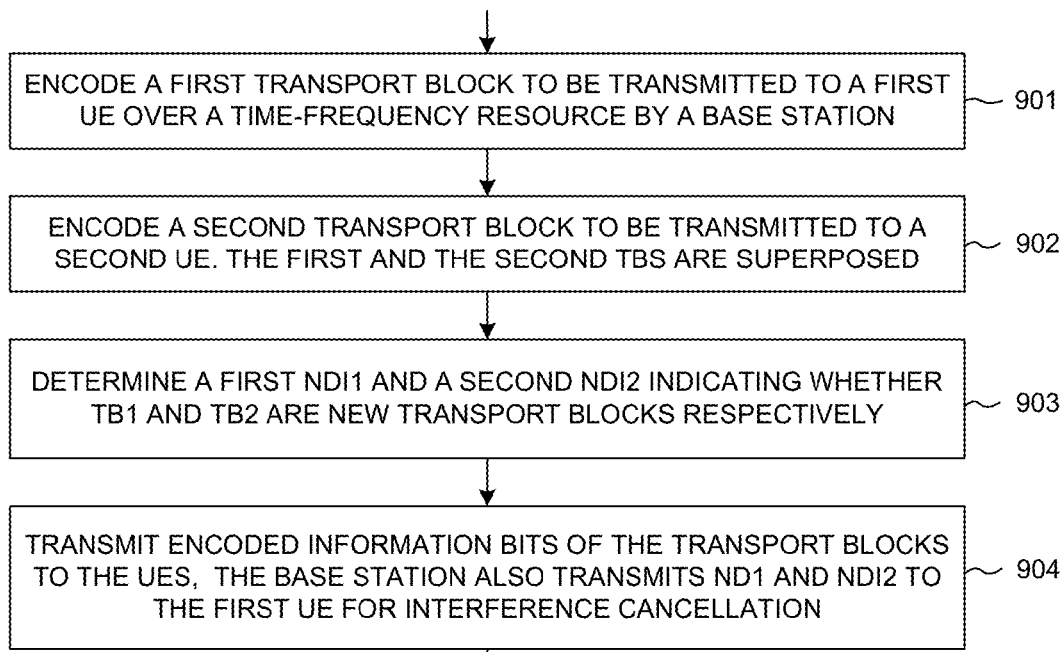
FIG. 9 is a flow chart of a method of soft channel bits combining from eNB perspective in accordance with one novel aspect.

FIG. 9 is a flow chart of a method of soft channel bits combining from eNB perspective in accordance with one novel aspect. In step 901, a base station encodes a first transport block TB1 to be transmitted to a first UE over a time-frequency resource. In step 902, the base station encodes a second transport block TB2 to be transmitted to a second UE. TB1 and TB2 are superposed. In step 903, the base station determines a first NDI1 and a second NDI2 indicating whether TB1 and TB2 are new transport blocks or retransmission transport blocks. In step 904, the base station transmits encoded information bits of the transport blocks to the UEs. The base station also transmits the first and the second NDIs to the first UE for interference cancellation.

Figure 10:
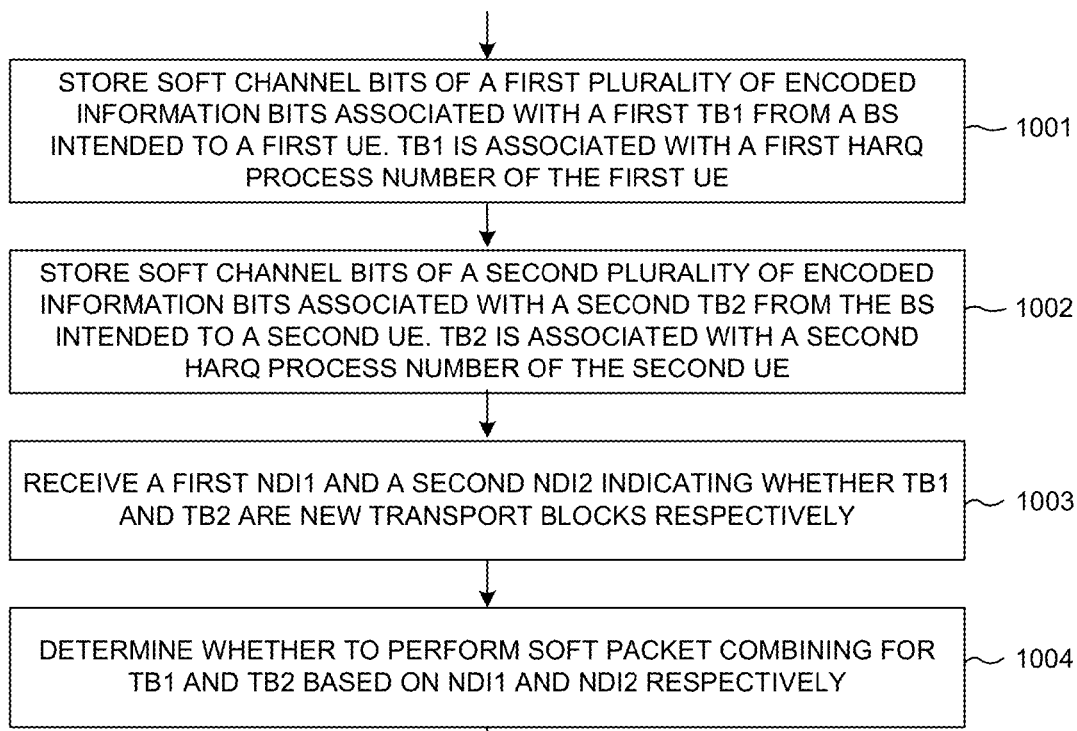
FIG. 10 is a flow chart of a method of soft channel bits combining from UE perspective in accordance with one novel aspect.

FIG. 10 is a flow chart of a method of soft channel bits combining from UE perspective in accordance with one novel aspect. In step 1001, a first UE stores soft channel bits of a first plurality of encoded information bits associated with a first transport block TB1 from a base station intended for the first UE. TB1 is associated with a first HARQ process number of the first UE. In step 1002, the first UE stores soft channel bits of a second plurality of encoded information bits associated with a second transport block TB2 from the BS intended to a second UE. TB2 is associated with a second HARQ process number of the second UE. In step 1003, the first UE receives a first NDI1 and a second NDI2 indicating whether TB1 and TB2 are new transport blocks or retransmission transport blocks. In step 1004, the first UE determines whether to perform soft packet combining for TB1 and TB2 based on NDI1 and NDI2.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   encoding a first transport block (TB1) to be transmitted to a first user equipment (UE) over a time-frequency resource by a base station;
   encoding a second transport block (TB2) to be transmitted to a second UE, wherein the second TB2 is superposed with the first TB1;
   determining a first new data indicator (NDI1) and a second new data indicator (NDI2) indicating whether TB1 and TB2 are new transport blocks or retransmission transport blocks respectively; and
   transmitting encoded information bits of the transport blocks to the UEs, wherein the base station also transmits NDI1 and NDI2 to the first UE for interference cancellation.

2. The method of claim 1, wherein the base station schedules the first UE and the second UE for non-orthogonal multiple access (NOMA) operation, and wherein the first UE is a high-geometry UE and the second UE is a low-geometry UE respectively.

3. The method of claim 1, wherein TB1 and TB2 are superposed and transmitted over the same time-frequency resource but with different transmission power levels.

4. The method of claim 1, wherein the base station schedules the first UE to decode and cancel the superposed second transport block TB2 via codeword level interference cancellation (CW-IC).

5. The method of claim 1, wherein TB1 transmission is associated with a first hybrid automatic request (HARQ) process number of the first UE, and wherein TB2 transmission is associated with a second HARQ process number of the second UE.

6. The method of claim 5, wherein NDI2 is toggled if TB2 is a new TB with respect to a previous TB transmitted in a previous subframe associated with the second HARQ process number of the second UE.

7. A method, comprising:
   storing soft channel bits of a first plurality of encoded information bits associated with a first transport block (TB1) from a base station intended for a first user equipment (UE), wherein TB1 is associated with a first HARQ process number of the first UE, and wherein the soft channel bits of the first plurality of encoded information bits are stored by the first UE in a first soft buffer of the first UE;
   storing soft channel bits of a second plurality of encoded information bits associated with a second transport block (TB2) from the base station intended for a second UE, wherein TB2 is superposed with TB1 and is associated with a second HARQ process number of the second UE, and wherein the soft channel bits of the second plurality of encoded information bits are stored by the first UE in a second soft buffer of the first UE;
   receiving a first new data indicator (NDI1) and a second new data indicator (NDI2) indicating whether TB1 and TB2 are new transport blocks or retransmission transport blocks respectively; and
   determining whether to perform soft packet combining for TB1 and TB2 based on NDI1 and NDI2 respectively.

8. The method of claim 7, wherein the first UE and the second UE are scheduled for non-orthogonal multiple access (NOMA) operation, and wherein the first UE is a high-geometry UE and the second UE is a low-geometry UE respectively.

9. The method of claim 7, wherein TB1 and TB2 are superposed and transmitted over the same time-frequency resource but with different transmission power levels.

10. The method of claim 7, wherein the first UE is scheduled by the base station to decode and cancel the superposed second transport block TB2 via codeword level interference cancellation (CW-IC).

11. The method of claim 7, wherein NDI2 is toggled if TB2 is a new TB with respect to a previous TB transmitted in a previous subframe associated with the second HARQ process number of the second UE.

12. The method of claim 11, wherein NDI2 indicates that TB2 is a new TB, and wherein the first UE clears the second soft buffer associated with the second HARQ process number of the second UE.

13. The method of claim 11, wherein NDI2 indicates that TB2 is a retransmission TB, and the first UE performs soft packet combining via the second soft buffer associated with the second HARQ process number of the second UE.

14. A first user equipment (UE), comprising:
   a soft buffer that stores soft channel bits of a first plurality of encoded information bits associated with a first transport block (TB1) from a base station intended for the first UE, wherein TB1 is associated with a first HARQ process number of the first UE;
   a second soft buffer that stores soft channel bits of a second plurality of encoded information bits associated with a second transport block (TB2) from the base station intended for a second UE, wherein TB2 is superposed with TB1 and is associated with a second HARQ process number of the second UE;
   a receiver that receives a first new data indicator (NDI1) and a second new data indicator (NDI2) indicating whether TB1 and TB2 are new transport blocks or retransmission transport blocks respectively; and a processor that determines whether to perform soft packet combining for TB1 and TB2 based on NDI1 and NDI2 respectively.

15. The UE of claim 14, wherein the first UE and the second UE are scheduled for non-orthogonal multiple access (NOMA) operation, and wherein the first UE is a high-geometry UE and the second UE is a low-geometry UE respectively.

16. The UE of claim 14, wherein TB1 and TB2 are superposed and transmitted over the same time-frequency resource but with different transmission power levels.

17. The UE of claim 14, wherein the first UE is scheduled by the base station to decode and cancel the superposed second transport block TB2 via codeword level interference cancellation (CW-IC).

18. The UE of claim 14, wherein NDI2 is toggled if TB2 is a new TB with respect to a previous TB transmitted in a previous subframe associated with the second HARQ process number of the second UE.

19. The UE of claim 18, wherein NDI2 indicates that TB2 is a new TB, and wherein the first UE clears the second soft buffer associated with the second HARQ process number of the second UE.

20. The UE of claim 18, wherein NDI2 indicates that TB2 is a retransmission TB, and the first UE performs soft packet combining via the second soft buffer associated with the second HARQ process number of the second UE.

* * * * *